United States Patent [19]
Ishida et al.

[11] 3,764,022
[45] Oct. 9, 1973

[54] VERTICAL TYPE TAKE-OUT DEVICE FOR INJECTION MOLDING MACHINES

[75] Inventors: Nobuhisa Ishida; Toshiyuki Tsubouchi, both of Tokyo, Japan

[73] Assignee: The Sailor Pen Co., Inc., Tokyo, Japan

[22] Filed: Mar. 10, 1971

[21] Appl. No.: 122,817

[52] U.S. Cl. .................................. 214/1 BD
[51] Int. Cl. ................................... B66c 1/42
[58] Field of Search ........................ 214/1 BD

[56] References Cited
UNITED STATES PATENTS
3,507,403  4/1970  Moore ........................ 214/1 BD
2,928,519  3/1960  Finston ....................... 214/1 BD X
3,604,570  9/1971  Canner ........................ 214/1 BB

FOREIGN PATENTS OR APPLICATIONS
641,423  4/1964  Belgium ...................... 214/1 B Primary Examiner—Robert G. Sheridan
Assistant Examiner—George F. Abraham
Attorney—Flynn & Frishauf

[57] ABSTRACT

A vertical type automatic take-out device for injection molding machines comprising a head; a holder capable of swinging sidewise and sliding back and forth by means of cylinders; a product-chucking mechanism fitted to the holder to be moved in a vertical direction; and a supporting structure to fit the head to the injection molding machine, wherein, upon completion of injection molding, the chucking mechanism is made to move vertically and horizontally to take out products, with runners from the metal molds; thereafter the holder automatically swings to carry them to a prescribed place; and there is further provided a detecting unit to detect whether the chucking mechanism securely holds all products molded.

7 Claims, 23 Drawing Figures

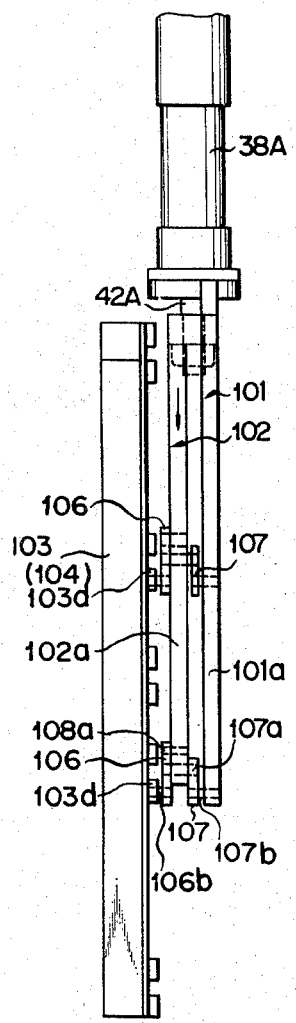
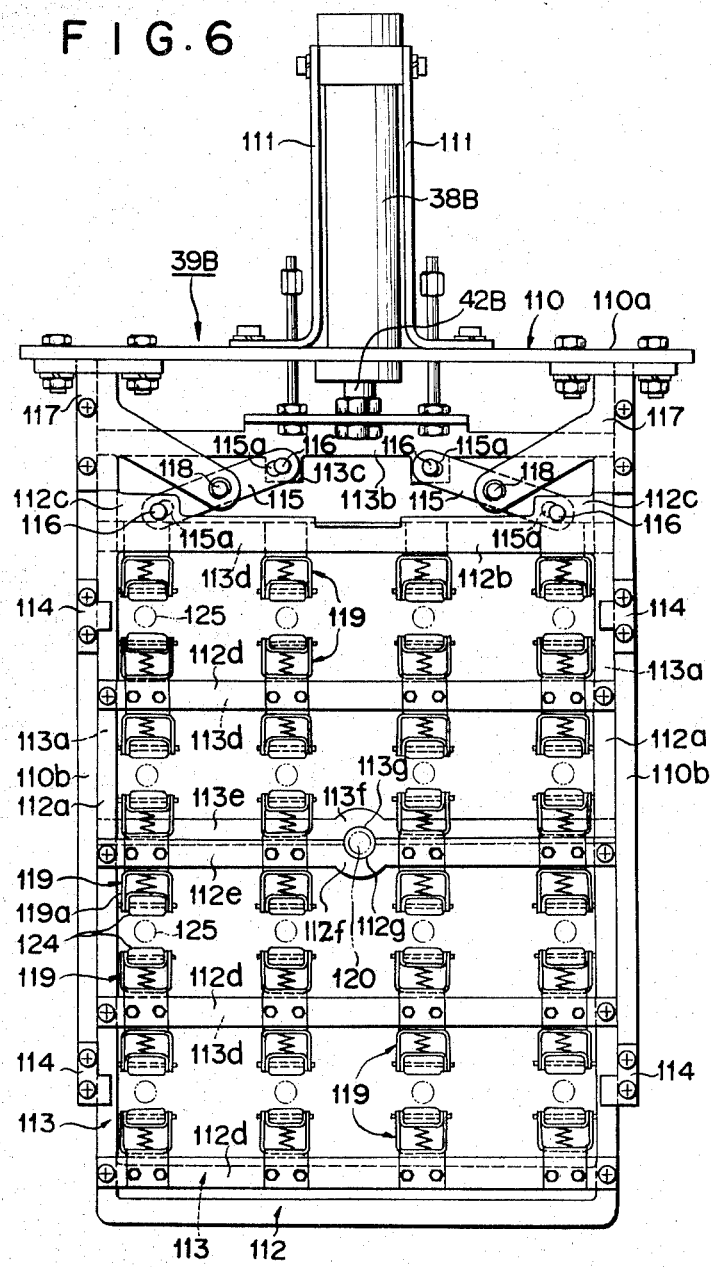
FIG. 5
FIG. 6

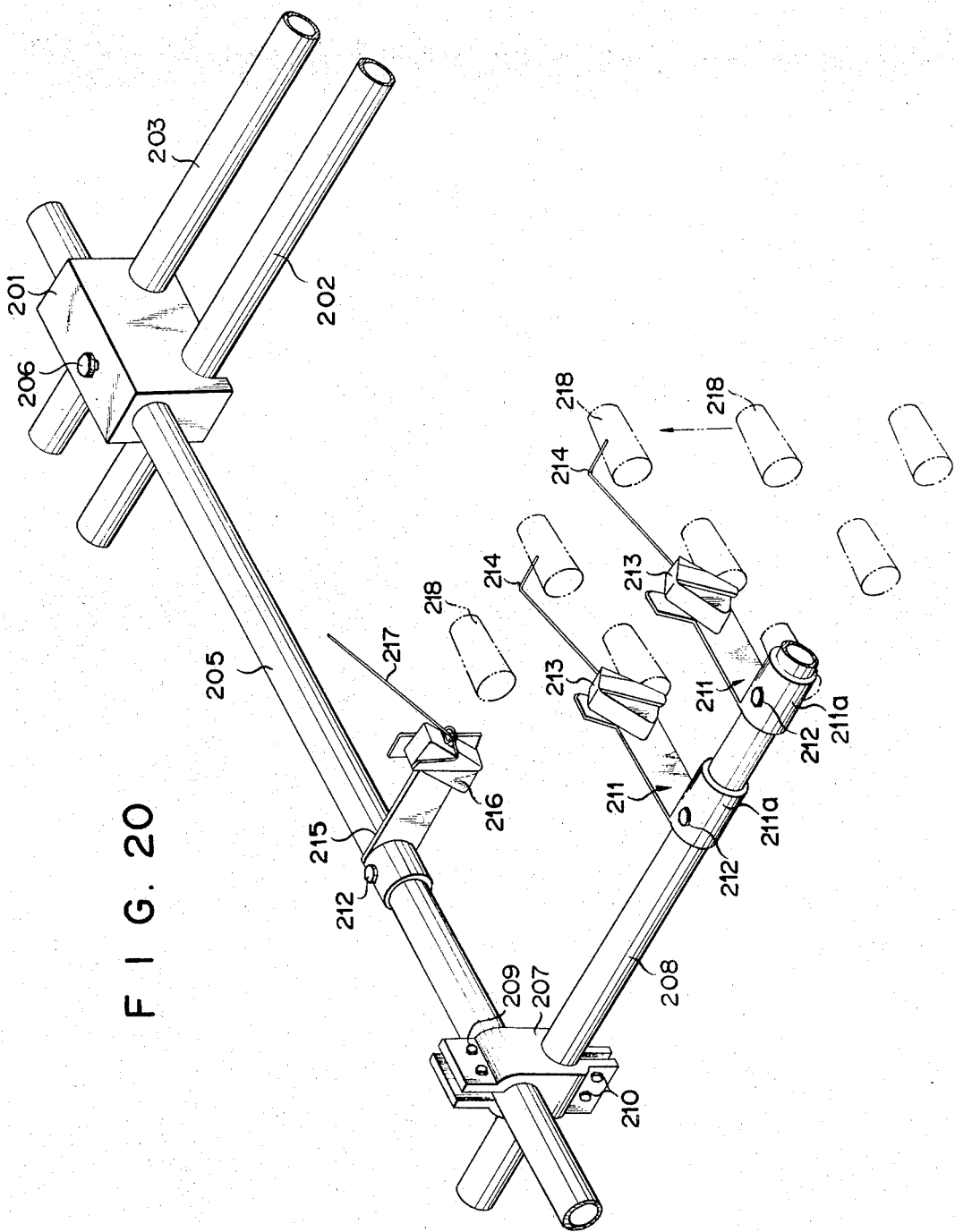

VERTICAL TYPE TAKE-OUT DEVICE FOR INJECTION MOLDING MACHINES

BACKGROUND OF THE INVENTION

The present invention relates to a vertical type automatic take out device for use with an injection molding machine which, when the molds are opened upon completion of injection molding, automatically takes out products, together with runners.

Heretofore, the removal of products and runners from the injection molds has been effected by a primitive manual method which, however, has the drawback that it not only requires operators and is ineffective, but also sometimes exposes them to danger.

There has already been proposed a device capable of automatically carrying out the entire cycle of taking out products, if necessary, with runners and conducting them to a desired place. However, the prior art device has the disadvantage that it has a complicated construction with the resulting increased manufacturing cost and is not always adapted to be easily fitted to any type of injection molding machine.

SUMMARY OF THE INVENTION

It is accordingly an object of the present invention to provide a vertical type automatic take-out device for use with an injection molding machine which, when the molds are opened upon completion of injection molding, can automatically remove products from the molds.

Another object of the invention is to provide an automatic take-out device for an injection molding machine which can also conduct products and runners taken out of the molds to a prescribed place.

Another object of the invention is to provide an automatic take-out device adapted for use with any type of injection molding machine by adjusting the position of a chucking mechanism on the support structure vertically as well as horizontally.

Another object of the invention is to provide an automatic take-out device capable of horizontally swivelling over the injection molding machine to remove the chucking mechanism from the operating area of said machine, thereby permitting a safe and easy work of fitting the metal molds to said machine and removing them therefrom and attaching, detaching and adjusting the chucking mechanism.

Still another object of the invention is to provide an automatic take-out device for an injection molding machine capable of improving the safety and efficiency of operation.

Still another object of the invention is to provide an automatic take-out device for an injection molding machine which is of sufficiently simple and compact construction to reduce manufacturing cost.

A further object of the invention is to provide an automatic take-out device for an injection molding machine which is provided with a chucking mechanism capable of taking out products either mechanically or pneumatically according to their kinds.

A still further object of the invention is to provide an automatic take-out device for an injection molding machine which is equipped with a detecting unit for checking whether the chucking mechanism has taken out all products from the metal molds and stopping the injection molding machine when there is still left any product in the molds, thereby preventing the occurrence of accidents due to the holdover of a product.

BRIEF DESCRIPTION OF THE DRAWING

FIG. 5 is a side view of the chucking mechanism of FIG. 4;

FIG. 6 is an elevation of a mechanical chucking mechanism according to another embodiment of the invention;

FIG. 20 is a perspective view of the detecting unit of FIG. 19;

DETAILED DESCRIPTION OF THE INVENTION

Figure 1:
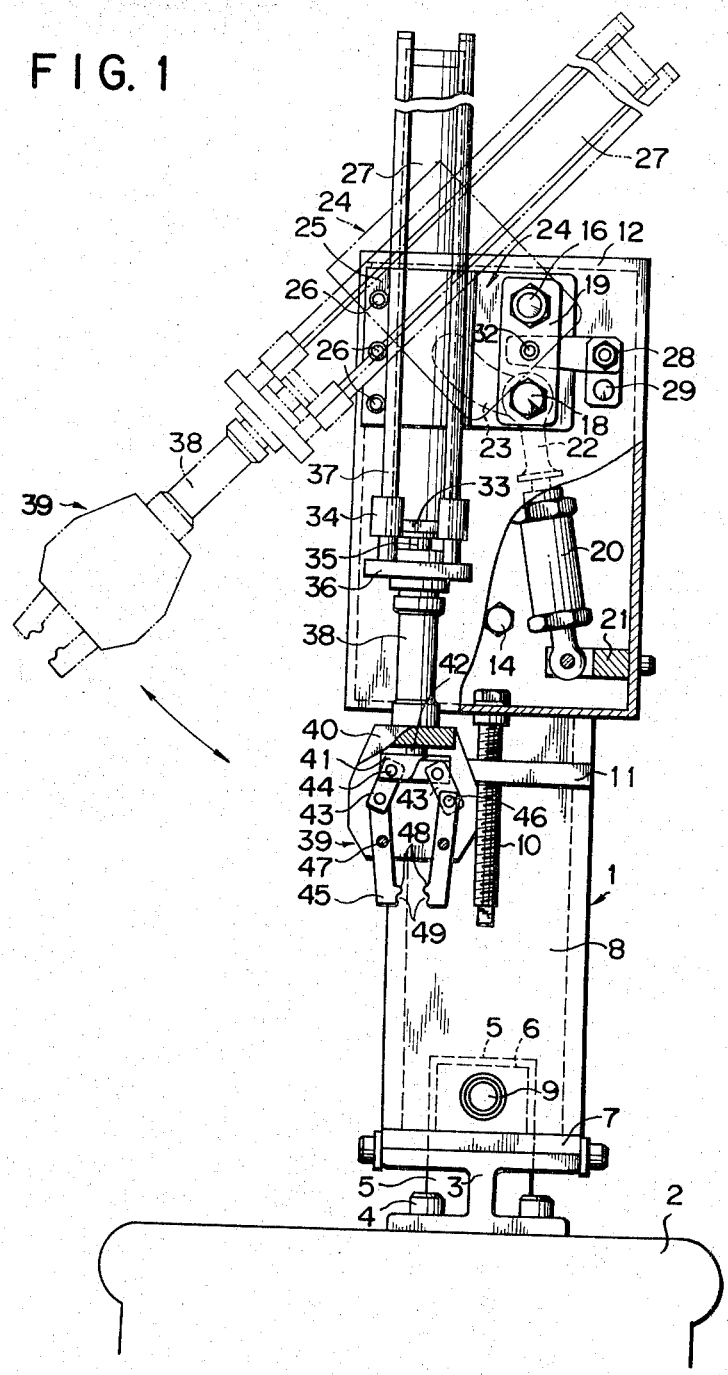
FIG. 1 is an elevation of an automatic take-out device according to an embodiment of the present invention to be used with an injection molding machine for molding side gate type products.
Figure 2:
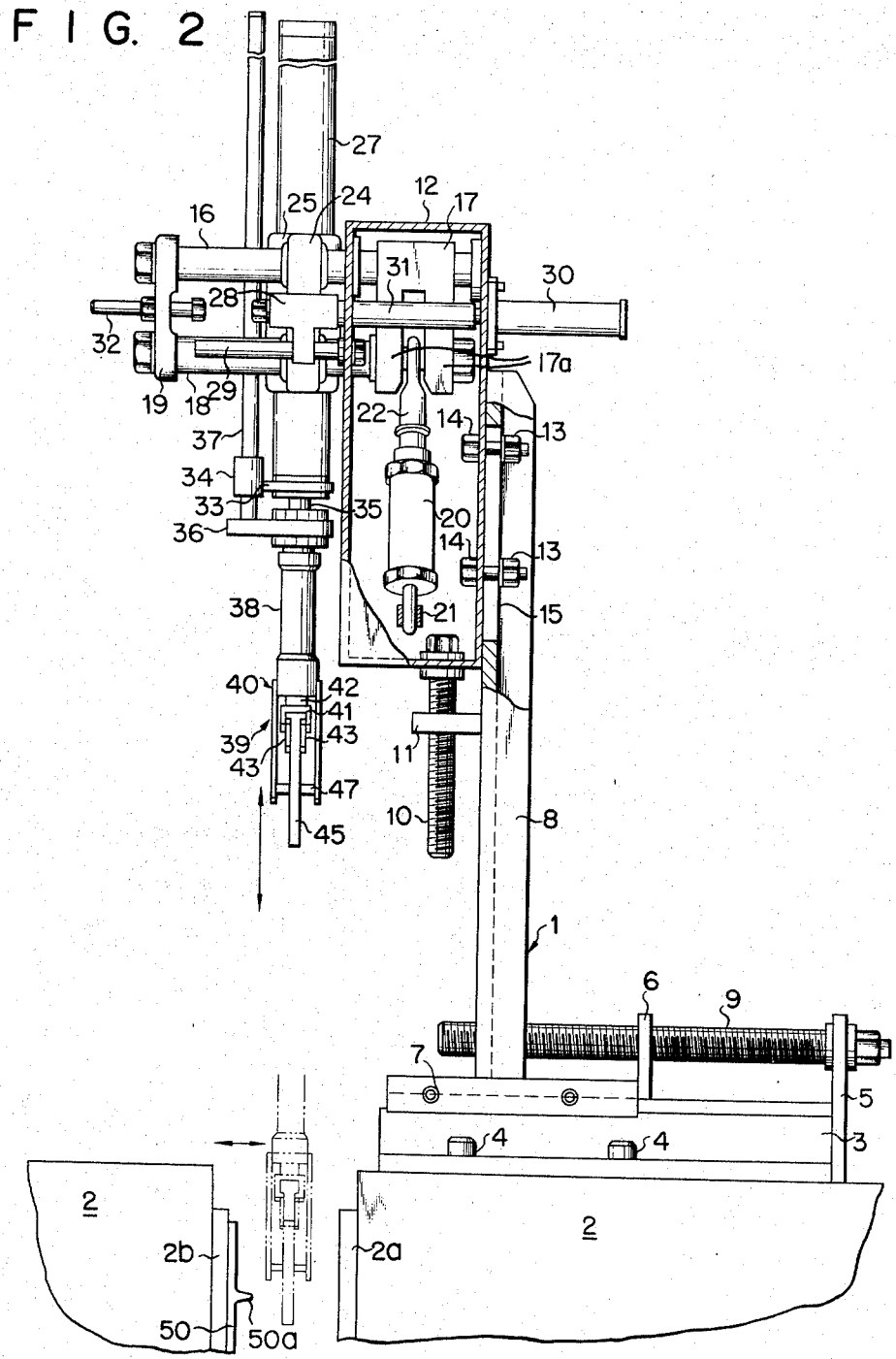
FIG. 2 is a side view of FIG. 1.
Figure 3:
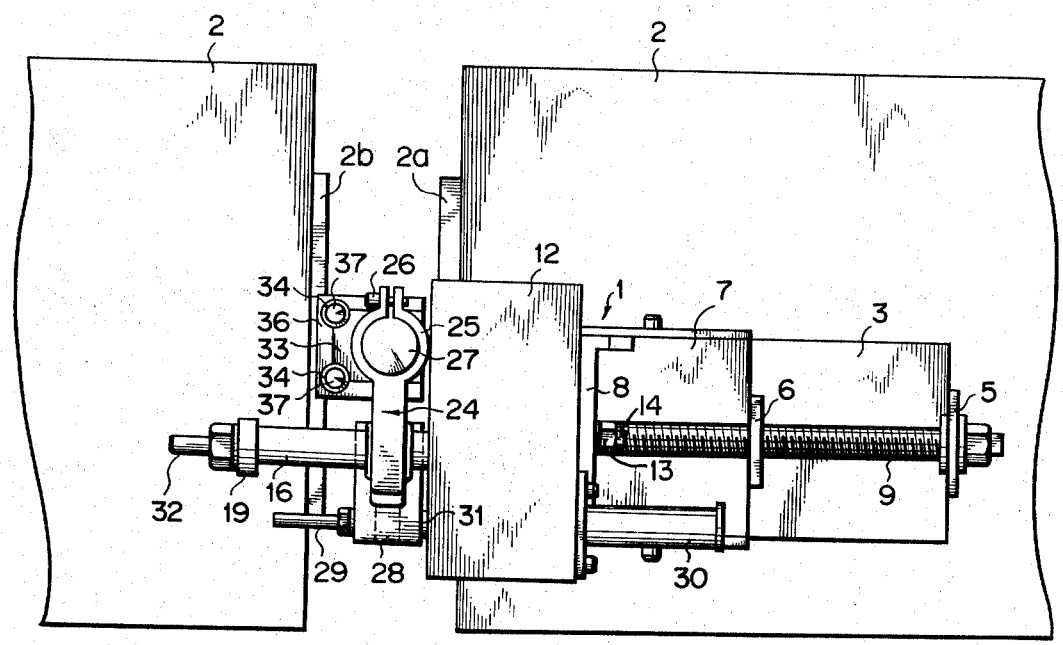
FIG. 3 is a plan view of FIG. 1.

Throughout FIGS. 1 to 3, numeral 1 denotes a supporting structure mounted on an injection molding machine 2 for molding side gate type products. The supporting structure 1 consists of a base 3 fixed to the molding machine 2 by screws 4 and assuming an I-shape (FIG. 1) in cross section; brackets 5 and 6 disposed at one end of the base 3 and substantially at the center thereof in a manner to project upward; a sliding member 7 provided between the bracket 6 and the other end of the base 3 so as to slide on the surface of said base 3; a support 8 embedded upright in the sliding member 7; a screw 9 rotatably fitted through the brackets 5 and 6 and inserted into a hole tapped at the lower end of the support 8 at right angles thereto; and a screw 10 vertically penetrating a bracket 11 horizontally projecting from the front surface of the support 8. It will be noted that throughout the following description, that side of the support 8 which faces the bracket 5 is referred to as the rear side and the opposite side as the front side.

At the front upper part of the support 8 is disposed a box type head 12 whose rear wall is fixed by bolts 14 and nuts 13. The upper part of the support 8 is perforated with a longitudinal bore 15 which is penetrated by the bolts 14. When the nuts 13 are loosened and the screw 10 is also made to rotate, then the vertical position of the head 12 can be adjusted. The box type head 12 is coupled with the support 8 by a grooved or dovetail joint and, can be fixed thereto by tightening the nuts 13.

At the upper part of the front and rear walls of the head 12 is rotatably supported a main shaft 16 so as to project horizontally ahead of the head 12. Referring to FIG. 2, a swing member 17 assuming an inverted U-shape in cross section swings about that portion of the main shaft 16 which is received in the head 12. The two-forked lower prongs 17a of the swing member 17 are penetrated by a swing shaft 18 projecting from the front wall of the head 12 in parallel with the main shaft 16. The front ends of the main shaft 16 and swing shaft 18 are coupled by a connecting plate 19. There is provided a first cylinder 20 whose lower end is rockably fitted to a mount 21 disposed on the inner side wall of the head 12. The free end of a piston rod 22 received in the cylinder 20 is so supported as to rotate about the swing shaft 18 between the prongs 17a of the swing member 17. The front wall of the head 12 is perforated with an arcuate bore 23 to allow the swing shaft 18 to rock about the main shaft 16.

Numeral 24 represents a holder penetrated by the main shaft 16 and swing shaft 18 at the front of the head 12 so as to slide along the axis of said shafts 16 and 18. On one side of the holder 24 is vertically (FIG. 1) held a second cylinder 27 in a sleeve portion 25 of the holder 24 by tightening said sleeve portion 25 by screws 26. The opposite side of the holder 24 to the sleeve portion 25 is received by a sliding block 28 assuming a U-shape in the horizontal plane in a manner to have said opposite side of the holder 24 inserted thereinto (FIG. 3.). The sliding block 28 is guided by a guiding rod 29 in its axial direction, said rod 29 being fitted into a through hole bored at the lower end of the sliding block 28 and projecting from the front wall of the head 12 in parallel with the main shaft 16.

To the rear wall of the head 12 is horizontally fixed a third cylinder 30, the piston rod 31 of which penetrates the rear and front walls of the head 12 and is secured to the rear end of the sliding block 28. Into the central part of the connecting plate 19 is horizontally fitted an adjusting screw 32 so as to face the front end of the sliding block 28. Adjustment of said screw 32 can arbitrarily regulate the horizontal stroke of the piston rod 31 and consequently the position of the holder 24.

To the lower end of the second cylinder 27 is fixed a guide plate 33 provided on the front end thereof with a pair of guiding sleeves 34. To the lower end of a piston rod 35 projecting from the lower end of the second cylinder 27 is fitted a member 36 for mounting the chucking mechanism. To the front part of said mounting member 36 are fitted a pair of guiding rods 37 vertically penetrating the guiding sleeves 34 of the guide plate 33 so as to slide therethrough vertically.

There will now be described a chucking means or mechanism 39. To the lower end of the mounting member 36 is fixed the piston end of a fourth cylinder 38. To the rod end of the cylinder 38 is fixed the chucking means or mechanism 39 in a manner to be suspended therefrom. In the casing 40 of the chucking means 39 are received a pair of linkages consisting of a link 41 fixed at right angles to the piston rod 42 inserted to the cylinder 38, links 43 coupled with both ends of the link 41 through pins 44 and links or pawl members 45 connected at one end to the links 43 through pins 46, rotatably supported substantially at the central part by the casing 40 through pins 47 and partly exposed to the lower side of the casing 40. Each linkage is in the form of a slider crank chain. The mutually facing sides of the lower end of the links or pawl members 45 are provided with projections 48 and depressions 49.

Throughout FIGS. 2 and 3, reference characters 2a and 2b respectively represent the fixed and movable metal molds of the injection molding machine 2. The injection molding machine with which the take-out device according to an embodiment of the present invention is used is intended to manufacture side gate type products. Upon completion of injection molding, the movable metal mold 2b is separated from the fixed mold 2a while holding a molded product 50. To the product 50 is attached a runner 50a extending rearward (FIG. 2).

The first to fourth cylinders 20, 27, 30 and 38 are connected with each other by electro-hydraulic means (not shown) and operated in proper sequence and timing.

There will now be described by reference to FIGS. 1 to 3 the operation of an automatic take-out device according to an embodiment of the present invention. It will be noted that the positions occupied by all the members associated with said take-out device when the piston rods of all the cylinders are retracted rearmost are hereinafter referred to as the "original positions."

When the movable metal mold 2b is opened upon completion of injection molding in the injection molding machine 2, the second cylinder 27 for moving the chucking mechanism 39 is operated to cause the piston rod 35 thereof to bring down said mechanism 39 together with the fourth cylinder 38 to an interspace between the fixed and movable metal molds 2a and 2b. The operation of the cylinder 27 is stopped when the depressions 49 of the paired links or pawl members 45 are substantially brought to a horizontal plane including the runner 50a. Next the third cylinder 30 for reciprocating the chucking mechanism 39 is actuated. The advance of the piston rod 31 thereof causes the sliding block 28 to slide forward on the guiding rod 29 and the holder 24 to be urged forward along the main shaft 16 and the swing shaft 18.

As a result, the chucking mechanism is shifted toward the movable metal mold 2b. In this case, the amount of said shift is so determined as to cause the pawl members 45 to be finally brought to a position to chuck the product 50 or its runner 50a.

Upon the stop of the third cylinder 30, the fourth cylinder 38 for operating the chucking mechanism 39 is actuated to bring down the piston rod 42 thereof causing the pawl members 45 to be closed for chucking the product 50 or its runner 50a.

With the product 50 or its runner 50a thus chucked, the third cylinder 30 is operated again but in an opposite direction to the preceding case so as to move the chucking means 39 backward and stops when the pawl members 45 return to the position where they were initially brought between the metal molds 2a and 2b. Then the second cylinder 27 is actuated to lift the chucking mechanism 39 together with the product 50 to the original position and stops upon completion of this operation.

Next, the first cylinder 20 and the piston rod 22 thereof work to swing the holder 24 together with the chucking mechanism 39 through a prescribed angle, for example, 45° toward the outside of the injection molding machine 2 (according to this embodiment, in a clockwise direction of FIG. 1) by means of the swing shaft 18. Said swing angle may be arbitrarily determined according to the condition in which the take-out device of the present invention is applied.

When the swing through a prescribed angle is finished, the first cylinder 20 stops. Then the second cylinder 27 is put into operation to let down slantwise the chucking mechanism 39 together with the product 50 on to a product receptacle (not shown), and ceases its work.

The fourth cylinder 38 is now actuated to retract its piston rod 42 causing the pawl members 45 to be opened for falling the product 50 into the product receptacle. When the product is taken into said receptacle, the second cylinder 27 is actuated again to lift the chucking mechanism 39 slantwise. The succeeding operation of the first cylinder causes the chucking mechanism 39 together with the holder 24 to swing back to the original position, completing one cycle of operation of the take-out device. Said device is left at the original position ready for the following cycle of operation. Repetition of said cycle enables products to be automatically taken out in turn from the injection molding machine.

Figure 4:
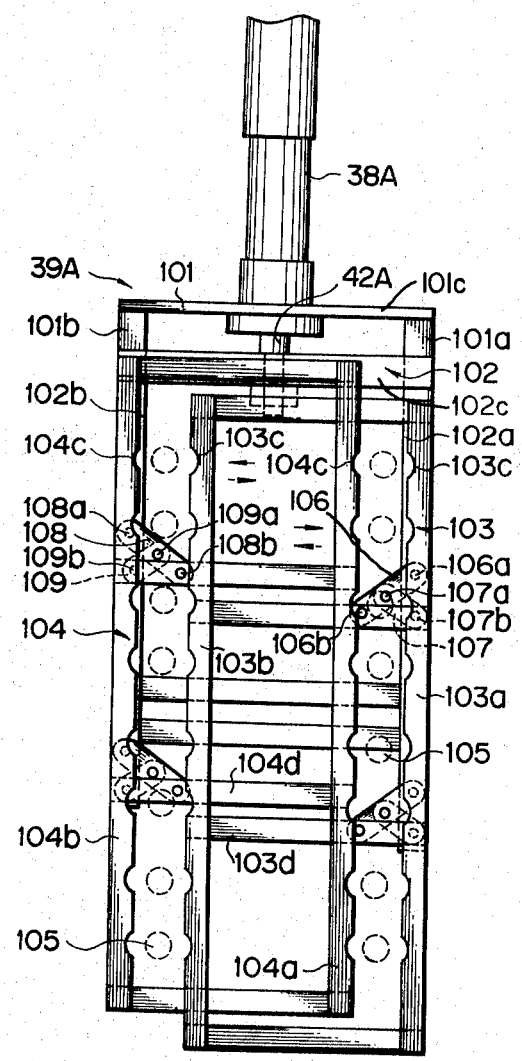
FIG. 4 is an elevation of a mechanical chucking mechanism according to an embodiment of the invention for use with the automatic take-out device.

FIGS. 4 and 5 jointly illustrate a chucking mechanism 39A according to another embodiment of the present invention for simultaneously chucking a large number of products when they are molded at the same time. Numeral 101 denotes a U shaped frame comprising a top member 101c and a pair of vertical side members 101a and 101b depending from said top member 101c. The top member 101c is fixed to the lower end of a cylinder 38A which corresponds to the fourth cylinder 38 of FIGS. 1 and 2. There is provided a vertically movable frame 102 comprising a top member 102c and vertical side members 102a and 102b depending therefrom. The top member 102c is fixed to the lower end of a piston rod 42A inserted into the cylinder 38A and is in contact with the vertical side members 101a and 101b of the fixed frame 101 so that the vertically movable frame 102 may be guided by the members 101a and 101b to move in the direction in which the piston rod 42A moves. The vertical side members 102a and 102b face the vertical side members 101a and 101b of the fixed frame 101 at a slight clearance. On the opposite side of the movable frame 102 to that which faces the fixed frame 101 are disposed crosswise movable frames 103 and 104 which have ladder form and are mostly superposed on each other. Referring to FIG. 4, there are formed depressions 103c in the left side of the right and left hand vertical side members 103a and 103b of the frame 103 at an interval equal to that at which the products are held in the metal molds. In the right side of the vertical side members 104a and 104b of the frame 104 are formed depressions 104c so as to face said depressions 103c. These depressions 103c and 104c jointly act to hold the products. The dotted circles bearing numeral 105 indicate the imaginary positions of products at which they would be gripped between said depressions 103c and 104c.

The traverses 103d of the frame 103 and the traverses 104d of the frame 104, except for the top and bottom ones thereof, extend in opposite directions to each other. The extending ends of said traverses 103d and 104d are coupled with the side members 102a and 102b of the frame 102 movable lengthwise of the chucking mechanism 39A and the side members 101a and 101b of the fixed frame 101 through Scott Russel's exactly straight-line motion mechanism. Namely, the links 106 are each disposed slantwise with respect to the side member 102a and traverse 103d and rotatably fitted at one end to the side member 102a through a pin 106a and at the other end to the traverse 103d through a pin 106b. Links 107 are each rotatably fitted at one end to the center of the link 106 through a pin 107a and at the other end to the side member 101a through a pin 107b. The pin 107b is positioned at the intersection of a vertical plane including a straight line passing the pin 106a in parallel with the side member 101a and a horizontal plane including a straight line passing the pin 106b in parallel with the traverse 103d. Links 108 are each arranged slantwise with respect to the side member 102b and traverse 104d, and rotatably fitted at one end to the side member 102b through a pin 108a and at the other end to the traverse 104d through a pin 108b. Links 109 are each rotatably fitted at one end to the center of the link 108 through a pin 109a and at the other end to the side member 101b through a pin 109b. The pin 109b is placed at the intersection of a vertical plane including a straight line passing the pin 108a in parallel with the side member 101b and a horizontal plane including a straight line passing the pin 108b in parallel with the traverse 104d.

Referring to the embodiment of FIGS. 4 and 5, when the piston rod 42A is lifted by operation of the fourth cylinder 38A, the frame 102 movable lengthwise of the chucking mechanism is brought down. Then side members 103a – 104a and 103b – 104b are drawn near to each other, enabling the products 105 to be gripped at the final stroke of the piston rod 42A between the aforesaid depressions 103c and 104c. Upon the descent of the piston rod 42A, the groups of mutually facing side members 103a – 104a and 103b – 104b are separated from each other through a reverse process to the preceding case. At the end of the return stroke of the piston rod 42, all the members of the chucking mechanism are brought back to the original positions, enabling the products 105 to be fully removed from the chucking mechanism 39A.

Figure 7:
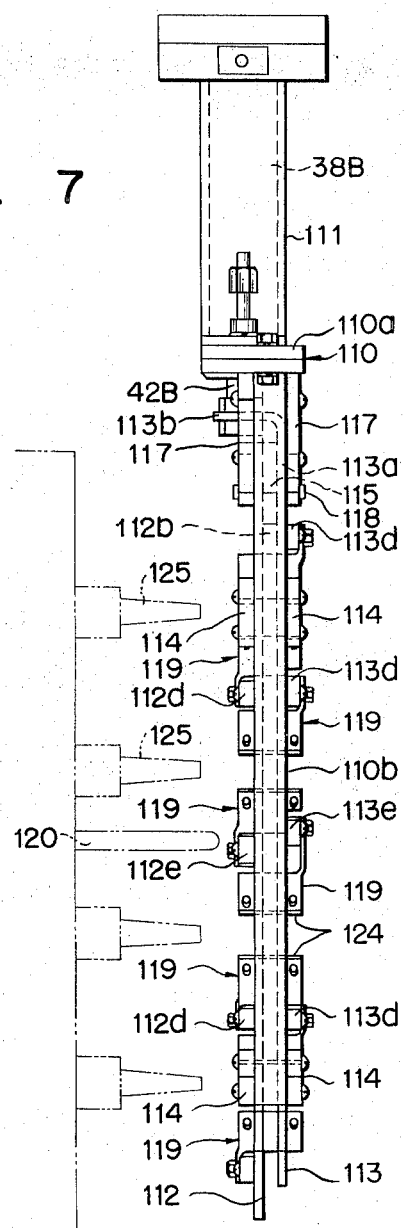
FIG. 7 is a side view of the chucking mechanism of FIG. 6.
Figure 8:
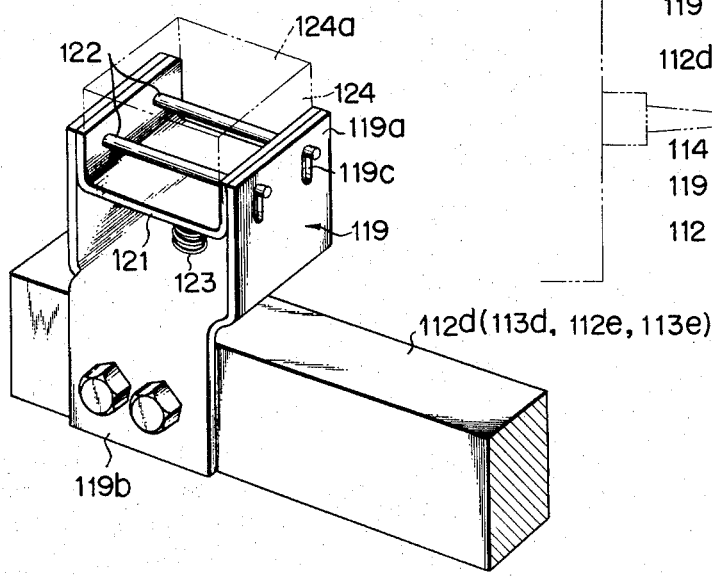
FIG. 8 is a perspective view of the holding assembly of the chucking mechanism of FIGS. 6 and 7.

FIGS. 6 to 8 jointly show a chucking mechanism 39B according to still another embodiment of the present invention. Throughout FIGS. 6 to 8, numeral 110 denotes a fixed frame assuming an inverted U-shape at the front. The traverse 110a at the upper end of said frame 110 is fixed to a cylinder 38B corresponding to the fourth cylinder 38 of FIG. 4 by angle bars 111. To both ends of the traverse 110a are fixed vertical side members 110b so as to be suspended therefrom. In the inner walls of the side members 110b are formed lengthwise two parallel lines of grooves, into which there are slidably fitted a pair of vertically movable frames 112 and 113 in ladder form. To the upper intermediate part and lower end of the side members 110b are fitted guide pieces 114 so as to slidably support the vertical side members 112a and 113a of the movable frames 112 and 113. The top traverse 113b of the movable frame 113 assumes, as shown in FIG. 7, an L-shape in cross section, and is fixed at the center to the end of the piston rod 42B of the cylinder 38B. Numeral 112b represents the top traverse of the movable frame 112 disposed below the top traverse 113b. Projections 112c formed of at both ends the surface of the top traverse 112b and projections 113c formed on the underside of the intermediate part of the top traverse 113b are engaged through pins 116 with a pair of connecting members 115 each bored at both ends with elongate holes 115a in a lengthwise direction. The connecting members 115 are rotatably fitted at the center through pins 118 to the lower end of a supporting arm 117 extending slantwise downward from the upper end of the side member 110b toward the inside of the frame 113.

To the side members 112a and 113a of the movable frames 112 and 113 are fixed the traverses 112d and 113d at an equal interval. On the top side of the traverses 112d and the underside of the traverses 113d are fixed holding assemblies 119 at an equal space. On the top and under sides of the center of the middle traverses 112e and 113e of the side members 112a and 113a respectively are formed runner holding portions 112f and 113f provided with depressions 112g and 113g so as to hold runners 120.

As shown in FIG. 8, the holding assembly 119 has a member 119a assuming a U-shape in front cross section and fixed with screws to the side surface of the traverses 112d, 113d, 112e and 113e by means of a mounting portion 119b. Both walls of the U-shaped member 119a are perforated with a pair of vertical long slits 119c. Into the upper part of the U-shaped member 119a is fitted another small U-shaped member 121 by means of rods 122 penetrating the former and latter U-shaped members 119a and 121 and the long slits 119c so as to move vertically insofar as the length of the slits 119c permits. Between the bottom walls of both U-shaped members 119a and 121 is disposed a compression spring 123 to urge the latter member 121 toward the open side of the former member 119a. To the open side of the small U-shaped member 121 is fitted a contact piece 124 made of elastic material such as rubber or synthetic resin so as to directly hold a product 125 on its surface 124a.

When the piston rod 42B is brought down by operation of the cylinder 38B, the movable frame 113 is lowered, causing the movable frame 112 to be raised through the connecting members 115 by that extent to which the movable frame 113 is let down. At the final stroke of the piston rod 42B, products 125 are gripped by the mutually facing holding assemblies 119 through the contact pieces 124, causing the runner 120 to be also held in the depressions 112g and 113g.

When the piston rod 42B is urged in the opposite direction, the chucking mechanism 39B of the embodiment of FIGS. 6 to 8 is operated through a reverse process to release the products 125 and runner 120.

This chucking mechanism 39B has the advantage of elastically holding the products 125.

Figure 9:
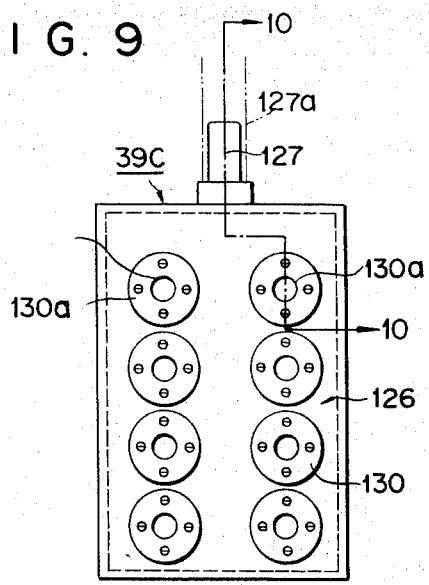
FIG. 9 is an elevation of a pneumatic chucking mechanism according to an embodiment of the invention.
Figure 10:
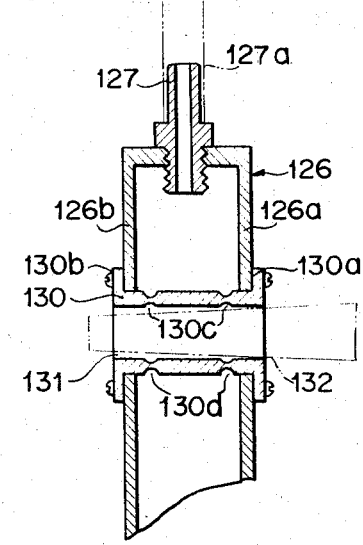
FIG. 10 is a sectional view along line 10—10 of FIG. 9.

FIGS. 9 and 10 jointly indicate a pneumatic chucking mechanism 39C according to a further embodiment of the invention. Numeral 126 denotes a hermetically sealed box type air chamber. At the center of the upper wall of the air chamber 126 is fixed, for example, with screws a fitting 127 having an air passage communicating with the air chamber 126 by projecting thereinto. To the upper end of the fitting 127 is connected a source of compressed air (not shown) through a connecting tube 127a. Referring to FIGS. 9 and 10, there are arranged in matrix form a plurality of sleeves 130 hermetically penetrating the front and rear walls 126a and 126b of the air chamber 126, and each provided with a pair of flanges 130a and 130b at both ends thereof, said flanges 130a and 130b being in contact with the walls 126a and 126b so as to prevent the sleeve 130 from slipping off the air chamber 127. The sleeve 130 is made of rubber, synthetic resin or other elastic materials. The hollow bore 131 penetrating the sleeve 130 has a sufficient diameter to cause a product 132 to be loosely held therein. On the inner and outer walls of the cylindrical portion of the sleeve 130 are formed annular grooves 130c and 130d at the corresponding positions to permit the easy deformation of the sleeve 130.

According to this chucking mechanism 39C, there is introduced compressed air into the air chamber 126 through the air passage in the fitting 127 after the products 132 are placed in the sleeves 130. Then the air pressure applied from the outside contracts the inner and outer diameters of the sleeves 130 to hold the products 132 therein. When air is drawn out of the chamber 126, the sleeves 130 regain the original inner and outer diameters to release the products 132. Since the products 132 are elastically held by the sleeves 130 the chucking mechanism 39C prevents products 132 from being damaged on the surface during the take-out operation.

Figure 11:
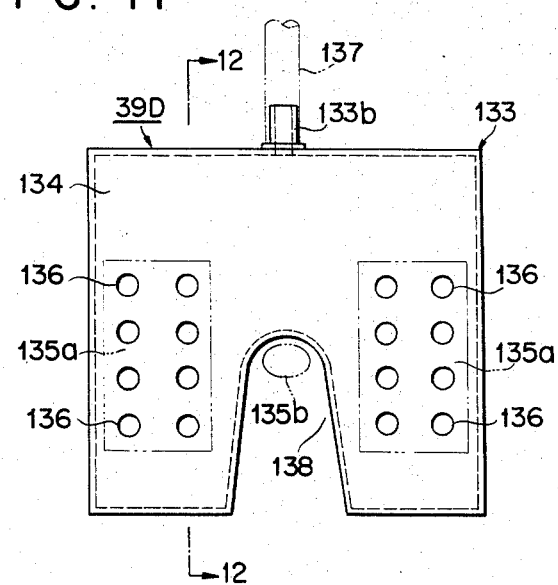
FIG. 11 is an elevation of a pneumatic chucking mechanism according to another embodiment of the invention.
Figure 12:
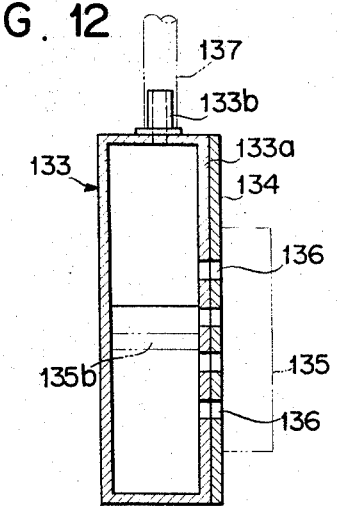
FIG. 12 is a sectional view along line 12—12 of FIG. 11.

FIGS. 11 and 12 jointly present a pneumatic chucking mechanism 39D according to a further embodiment of the present invention. Numeral 133 shows a box type air chamber. Referring to FIG. 12, there is mounted on the front wall 133a of the air chamber 133 a contact plate 134 made of elastic material such as rubber or synthetic resin. That part of the contact plate 134 which is brought into contact with product 135 is perforated with a plurality of small apertures 136 penetrating the front wall 133a and contact plate 134.

At the center of the top wall of the air chamber 133 is projectively provided an air passage 133b, to which there is attached an evacuating means (not shown) including, for example, a connecting tube 137, vacuum pump and reversible vacuum blower. The air chamber 133 is so deeply depressed at the bottom center as to provide a saddle-like cavity 138, into which the runner 135b of the product 135 is inserted.

When air is drawn out of the chamber 133 through the air passage 133b and connecting tube 137 with the surface of the product 135 kept in contact with the whole contact area 135a of the contact plate 134, then the product 135 is sucked to the contact plate 134. Conversely where air is introduced into the chamber 133, the product 135 is released from the contact plate 134. The embodiment of FIGS. 11 and 12 has the advantage that a product with a large surface is prevented from being damaged while being held by the chucking mechanism. Where it is not necessary to take a runner into consideration, there is no need to provide the aforesaid saddle-like cavity 138 at the bottom of the air chamber 133.

Figure 13:
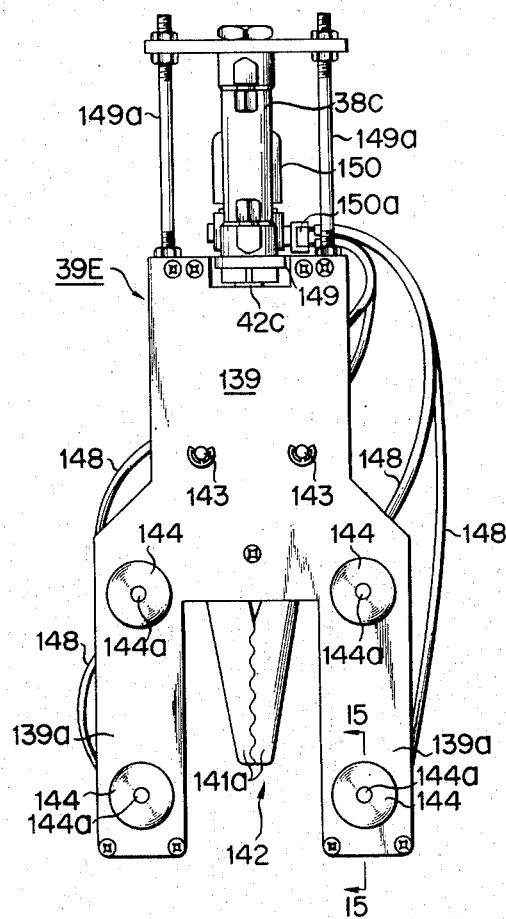
FIG. 13 represents a pneumatic chucking mechanism provided with absorbers according to another embodiment of the invention.
Figure 14:
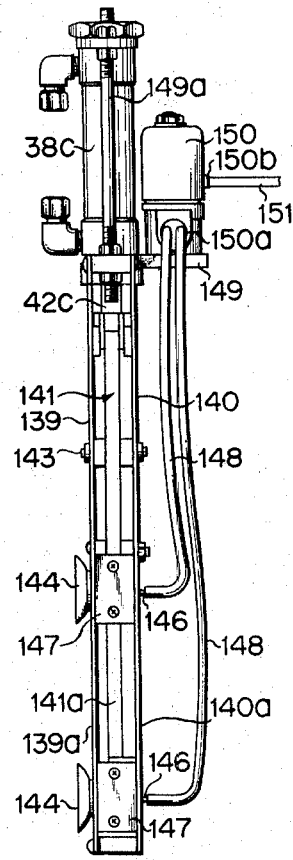
FIG. 14 is a side view of the chucking mechanism of FIG. 13.
Figure 15:
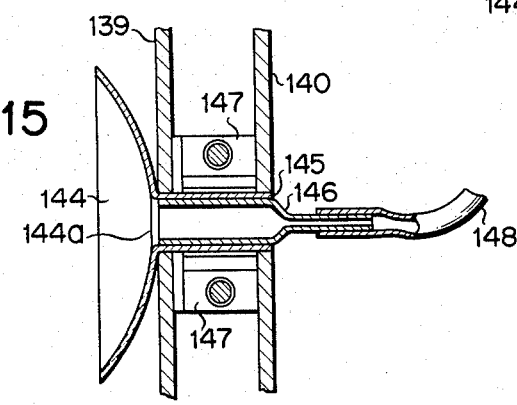
FIG. 15 is a cross sectional view along line 15—15 of the pneumatic chucking mechanism of FIGS. 13 and 14 fitted with an absorber.

FIGS. 13 to 15 jointly illustrate a chucking mechanism 39E according to a still further embodiment of the present invention. To the lower end portion of a cylinder 38C corresponding to the fourth cylinder 38 of FIGS. 1 and 2 are fixed a pair of parallel suspending mount plates 139 and 140 each assuming an inverted Y-shape by means of supporting rods 149a with the piston rod 42C disposed therebetween. Between the mount plates 139 and 140 is placed a runner chucking assembly 141, the upper end of which is fixed to the lower end of the piston rod 42C of the cylinder 38c. Said assembly 141 is of exactly the same arrangement as the linkages included in the casing 40 of the chucking mechanism 39 used in the embodiment of FIGS. 1 to 3, and description of said assembly 141 is omitted. The paired housing members 141a of FIG. 13 correspond to the paired pawl members 45 used in the embodiment of FIGS. 1 to 3. The ends of said holding members 141a project into a cavity 142 defined between forked portions 139a and 140a at the lower end of the mount members 139 and 140. The holding members 141a rock about the shafts 143 by the vertical movement of the piston rod 42C to cause the mutually facing lower ends of the holding members 141a to be closed or opened, thereby holding or releasing a runner.

At least the upper and lower parts of the forked portions 139a of the mount plate 139 are each fitted with funnel shaped absorbers 144 with its opening exposed to the outside. The absorber 144 is made of elastic material, for example, rubber. At the center of the absorber 144 is formed a hollow cylindrical portion 145 penetrating the mount plates 139 and 140. Into said cylindrical portion 145 is hermetically fitted a tube 146, the interior of which communicates with that of the absorber 144 through its central aperture 144a. The hollow cylindrical portion 145 is clamped with screws from both sides by fixing members 147 between the mount plates 139 and 140 so as to be prevented from falling off the mount plates 139 and 140.

To that end of the tube 146 which projects toward the mount plate 140 is connected one end of an air base 148, the other end of which is connected to port A 150a of an electric two-way valve 150 mounted on a plate member 149 disposed on the lower end of the cylinder 38C so as to extend outside of the mount plate 140. Port P 150b of the two-way valve 150 is connected to an evacuating device (not shown) through a tubing 151, port B (not shown) of said valve 150 communicating with the atmosphere.

Let it be assumed that the relative large plain end face of a product is brought into contact with the absorbers 144. When, at this time, the part A 150a and port P 150b are connected with each other by operating the valve 150 and air is drawn out by a compressing device (not shown), the absorbers 144 are evacuated to cause the product to be sucked thereto. When the valve 150 is switched the other way, port A is disconnected from port P 150b and communicates with port T (not shown) of said valve 150 open to the atmosphere, and the pressure in the absorbers 144 is brought back to a normal level to release the product.

As apparent from the foregoing description, the product is held elastically by the elastic absorbers 144 by suction, and advantageously prevented from having its chucked surface damaged. Where it is not necessary to take a runner into consideration, there is no need to provide the cavity 142 at the lower part of the mount plates 139 and 140 and holding members 141a.

Figure 16:
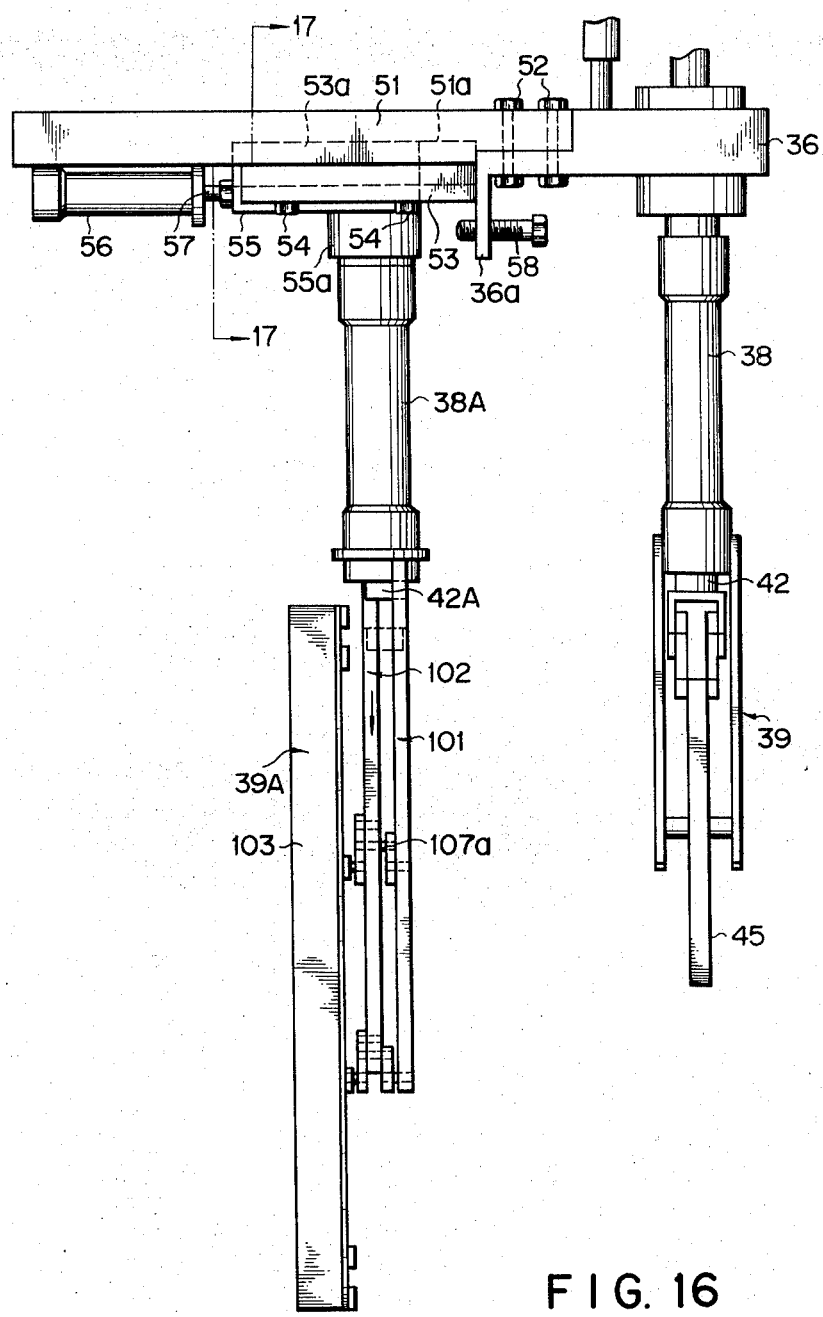
FIG. 16 is a side view of an assembly of a pair of chucking mechanisms of an automatic take-out device used with a pin point gate type injection molding machine and a mounting memmber according to an embodiment of the invention to which said chucking mechanisms are attached.
Figure 17:
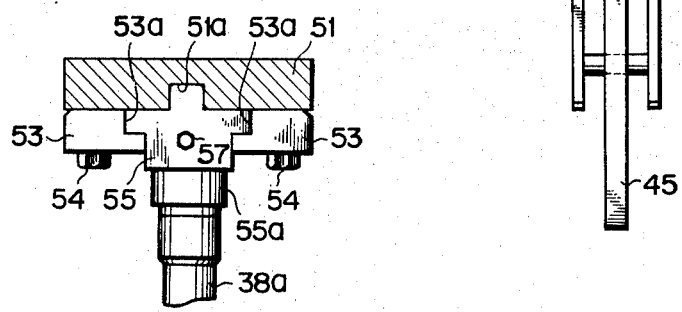
FIG. 17 is a sectional view along line 17—17 of FIG. 16.

FIGS. 16 and 17 illustrate part of a take-out device according to a further embodiment of the present invention. This embodiment includes a chucking mechanism similar to that of FIGS. 1 to 3. Therefore there are omitted from the figures reference numerals of the other members than the mounting member 36, fourth cylinder 38 and chucking mechanism 39 of FIG. 2. Near the front end of the mounting member 36 is fixed with bolts 52 an extension member 51 on the underside of which there is formed a guide groove 51a extending lengthwise of said extension member 51. On both sides of the bottom surface of the extension member 51 are fixed with screws 54 a pair of guide members 53 extending from the mounting member 36 to the substantially central part of the extension member 51. Inside of the upper part of the guide member 53 is formed a guide groove 53a.

Numeral 55 represents a sliding member guided lengthwise through the grooves 51a and 53a (FIG. 17). To the boss 55a disposed under the sliding member 55 is fitted a chucking mechanism 39A according to the embodiment of FIGS. 4 and 5. The cylinder 38A of said mechanism 39A is here referred to as the "fifth cylinder". On the underside of the front end of the extension member 51 is disposed a sixth cylinder 56. A piston rod 57 inserted into said sixth cylinder 56 is fixed at one end to the front end of the sliding member 55. At the front end of the mounting member 36 is formed a downward bent portion 36a, through which there is inserted a lengthwise adjustable screw 58 to regulate the stroke of the piston rod 57. Referring to FIGS. 2 and 16 where there is applied an automatic take-out device of the aforementioned arrangement in a pin point gate type injection molding machine wherein there is left a runner in the fixed mold, the products are taken out through the following cycle of operation.

Metal molds open — the second cylinder 27 is operated — the chucking mechsnisms 39 and 39A are brought down at the same time — the second cylinder 27 stops — the fourth cylinder 38 is actuated — the chucking mechanism 39 chucks a runner — the fourth cylinder 38 stops — the third cylinder 30 works — the chucking mechanisms 39 and 39A advance at the same time — a runner is fully drawn out — the third cylinder 30 stops — the fifth cylinder 38A is put into operation — the chucking mechanism 39A chucks the products — the fifth cylinder 38A stops — the sixth cylinder 56 is actuated — the chucking mechanism 39A is retracted — the products are fully taken out — the sixth cylinder 56 stops — the second cylinder 27 is actuated — the chucking mechanisms 39 and 39A are lifted — the second cylinder 27 stops — the first cylinder 20 works — the chucking mechanisms 39 and 39A swing — the first cylinder 20 stops — the second cylinder 27 is operated — the chucking mechanisms 39 and 39A are slantwise let down — the second cylinder 27 stops — the fourth and fifth cylinders 38 and 38A are operated — the products and runner are released — the fourth and fifth cylinders 38 and 38A stop — the second cylinder 27 is operated — the chucking mechanisms 39 and 39A are slantwise lifted — the second cylinder 27 stops — the first cylinder 20 works — the chucking mechanisms 39 and 39A swing back — the first cylinder 20 stops — the third and sixth cylinders 30 and 56 are operated — the chucking mechanisms 39 and 39A are brought back to the original positions — the take-out device is made ready for the start of the following cycle of operation.

Figure 18:
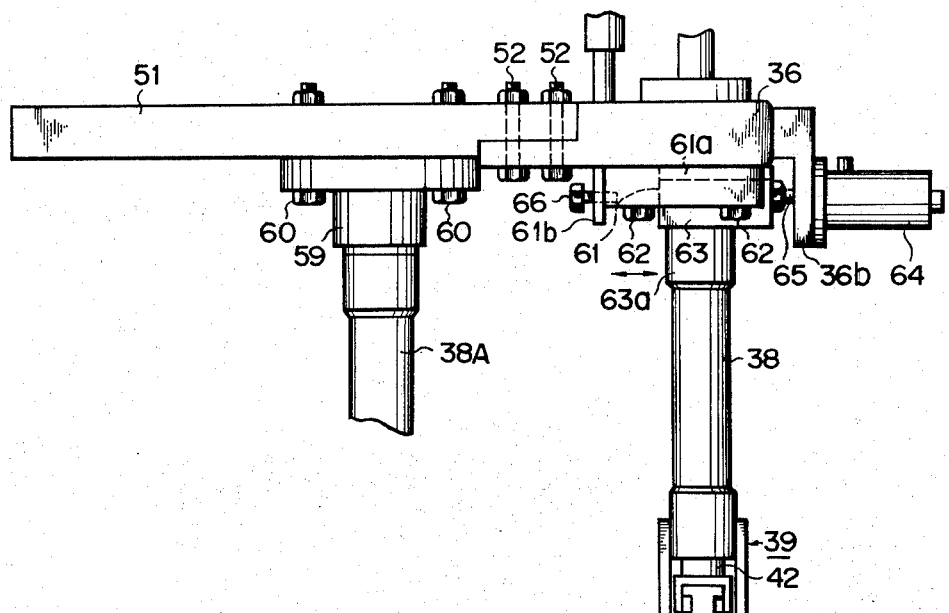
FIG. 18 is a side view of an assembly of a pair of chucking mechanisms of an automatic take-out device used with a pin point gate type injection molding machine and a mounting member according to another embodiment of the invention to which said chucking mechanisms are fitted.

FIG. 18 shows part of a take-out device according to a still further embodiment of the present invention. According to this embodiment, a seventh cylinder 64 in lieu of the sixth cylinder 56 of the embodiment of FIGS. 16 and 17 is used to drive the chucking mechanism 39. Referring to FIG. 18, a boss 59 with which the fifth cylinder 38A of the chucking mechanism 39A is connected is fixed to the underside of the extension member 51 with bolts 60. To both sides of the bottom surface of the mounting member 36 are fixed with screws 62 a pair of guide members 61 corresponding to the guide members 54 of FIGS. 16 and 17. Inside of the upper part of the guide member 61 are formed guide grooves 61a. There is provided a sliding member 63 which slides lengthwise through the guide grooves 61a. To the underside of the boss 63a of said sliding member 63 is fixed the fourth cylinder 38 of the chucking member 39.

At the rear end of the mounting member 36 is formed a downward bent portion 36b. To said rear end is also projectively fitted the seventh cylinder 64, the piston rod 65 of which penetrates the downward bent portion 36b and is fixed at one end to the rear end of the guide member 63. On a plate 61b fixed at the front end of the guide member 61 is mounted a screw 66 for adjusting the stroke of the piston rod 65.

Where there is applied the take-out device of the embodiment of FIG. 18 in a pin gate type injection molding machine wherein there is left a runner in the fixed mold, the products are taken out by the following cycle of operation.

Metal molds open — the second cylinder 27 is operated — the chucking mechanisms 39 and 39A are brought down at the same time — the fourth cylinder 38 is actuated — the chucking mechanism 39 chucks a runner — the third cylinder 30 is driven — the chucking mechanisms 39 and 39A advance — the fifth cylinder 38A works — the chucking mechanism 39A chucks the products — the third cylinder 30 is operated — the chucking mechanisms 39 and 39A are retracted — the products are fully taken out — the seventh cylinder 64 is driven — the chucking mechanism 39 advances — the runner is fully taken out — the second cylinder 27 is actuated — the chucking mechanisms 39 and 39A are lifted — the same steps as those of the embodiment of FIGS. 16 and 17 extending from the forward to the backward swing of the chucking mechanisms 39 and 39a — the seventh cylinder 64 works — the chucking mechanism 39 is brought back to the original position — the take-out device is made ready for the start of the following cycle of operation.

All the cylinders are on the principle stopped prior to the start of the succeeding step. Accordingly, the expression "the cylinder stops" is omitted from the above description of the operating cycle in order to avoid duplication, because it will be readily understood from the sequential steps previously shown with respect to the embodiment of FIG. 16 and 17.

Referring to the embodiments of FIGS. 16 to 18, it is possible to fix the upper end of the chucking members 39 and 39A directly to the underside of the mounting member and/or the extension member 51 of the mounting member 36 without using the cylinders 56 and 64 and other parts associated therewith. In such case, the take-out device of the present invention is most preferably applicable in that type of pin point gate injection molding machine in which there is left a runner in the center plate.

The take-out device of the present invention associated with the above-mentioned case is operated through the following cycle.

Metal molds open — the second cylinder 27 is operated — the chucking mechanisms 39 and 39A are brought down at the same time — the third cylinder 30 is actuated — the chucking mechanisms 39 and 39A advance at the same time — the fourth and fifth cylinders 38 and 38A are driven — the chucking mechanisms 39 and 39A respectively chuck a runner and products — the third cylinder 30 works — the chucking mechanisms 39 and 39A are retracted with the runner and products at the same time — the second cylinder 27 is operated — the chucking mechanisms 39 and 39A are lifted — the same steps as those of the previous case extending from the forward to the backward swing of the chucking mechanisms 39 and 39A — the take-out device is made ready for the start of the following cycle of operation.

The chucking mechanisms of FIGS. 16 to 18 consisted of the type used in the embodiment of FIGS. 4 and 5. However, there may be used other types described herein depending on the kind of product to be chucked.

Figure 19:
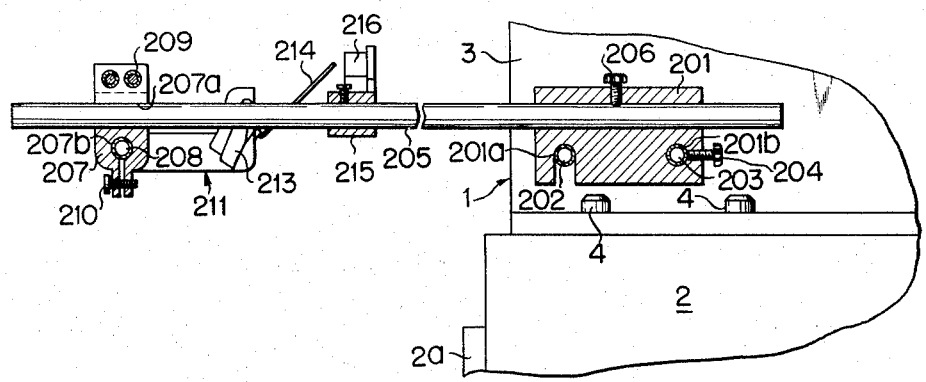
FIG. 19 is a side view of a detecting unit for detecting products according to an embodiment of the invention for use with the present automatic take-out device.

FIGS. 19 and 20 jointly illustrate a detecting unit according to an embodiment of the present invention for use with the present take-out device. Numeral 201 represents supporting blocks disposed at the front parts of the lateral sides of the base 3 of a supporting structure 1. Said supporting blocks 201 are guided crosswise of the base 3 by sliding along two guiding rods 202 and 203 inserted crosswise into the base 3 under pressure by engagement of said rods 202 and 203 with holes 201a and 201b bored through said blocks 201. The front hole 201a of the supporting block 201 is notched at the bottom to facilitate said engagement. The rear hole 201b is fitted with a screw 204 to enable the block 201 to be tightly fitted to the guiding rod 203.

There is inserted through the block 201 a forward extending longitudinal rod 205, which generally penetrates the block 201 and is fixed thereto with a screw 206. To the forward end of the longitudinal rod 205 is fitted a fixing member 207, by engagement of the hole 207a of the fixing member 207 with the rod 205 the upper part of the fixing member 207 is split into two parallel portions extending along the rod 205 and the lower part thereof is split into two parallel portions arranged crosswise of said rod 205. Into a hole 207b crosswise bored at the lower part of the fixing member 207 is inserted a supporting rod 208 intersecting the longitudinal rod 205 at right angles. Firm attachment of the fixing member 207 to the longitudinal rod 205 and supporting rod 208 is effected simply by tightening screws 209 and 210 respectively.

Numeral 211 denotes extension arms horizontally extending rearward of the supporting rod 208 substantially at right angles thereto. The front end of the extension arm 211 is formed into a hollow cylindrical portion 211a so as to slide along the supporting rod 208. The opposite end of the extension arm 211 is provided with a microswitch 213, from which there rearwardly extends a contact wire 214, the free end of which is bent at right angles in a horizontal plane. The longitudinal rod 205 may be fitted with another extension arm 215 similar to the aforesaid extension arm 211. Said another extension arm 215 may be provided with a microswitch 216, the contact wire 217 of which, however, need not be bent at the end like that of the microswitch of the extension arm 211.

Where there are taken out products 218 fabricated in matrix arrangement in the metal molds by the chucking mechanism 39A, 39B, 39C, 39D or 39E according to any of the embodiments of FIGS. 4 to 15, there is fitted to the supporting rod 208 (or the supporting rod 208 and longitudinal rods 205) extension arms 211 (or extension arms 211 and 215 fitted with microswitches 213 and 216) provided with as many microswitches 213 as the products arranged in the first horizontal row. The contact wires 214 (or 214 and 217) of the microswitches 213 lightly contact the products 218 lifted by the take-out device to actuate the microswitch 213 (or 213 and 216).

Where the detecting unit is arranged as described above, the contact wires 214 (or 214 and 217) of the microswitches 213 (or 213 and 216) are lifted by the products 218 disposed in the same row to operate the microswitches 213.

If all the products 218 are lifted by the take-out device, then there will be operated as many microswitches as the products thus lifted. Should, however, the take-out device fail to pickup even a single product in any row of the matrix, the microswitches associated with said row will be reduced in operated number by that extent. The number of actuated microswitches is supplied to a counter (not shown) in the form of an electric signal. When the microswitches generate as many signals as their total number the injection molding machine is continued in operation. However, if the signals generated are reduced in number even by one, then the molding machine will be automatically stopped, preventing the occurrence of accidents due to the holdover of a product in the metal molds.

Further, loosening of the screws 204 and 210 permits adjustment of an interval between the longitudinal rods 205 and loosening of the screws 206 and 209 enables regulation of the horizontal position of the supporting rod 208. In addition, loosening of screws 212 permits adjustment of the position of the extension arms 211 and 215. Accordingly, the detecting unit of the present invention is capable of very versatile operation.

Figure 21:
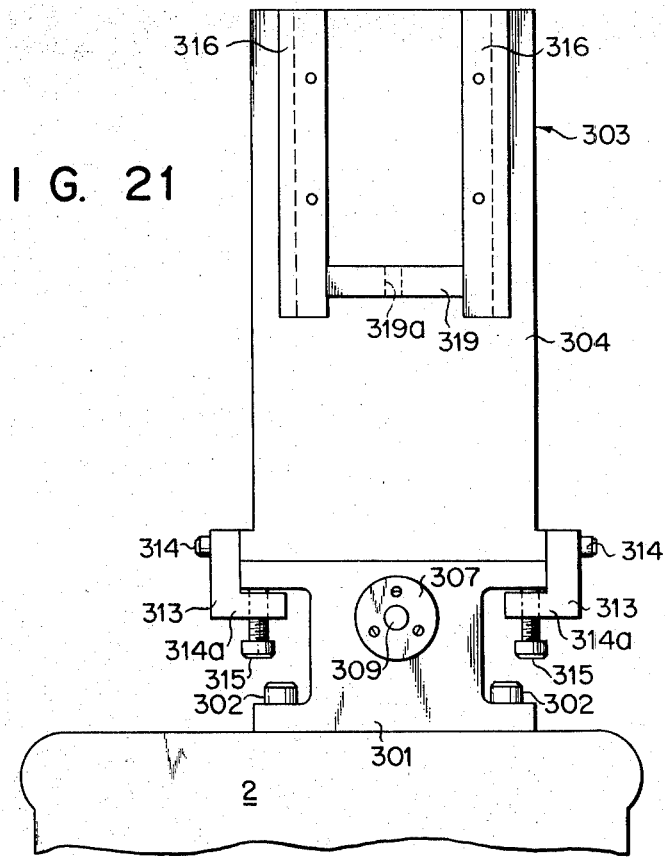
FIG. 21 is an elevation of a supporting structure according to an embodiment of the invention for use with the present automatic take-out device.
Figure 23:
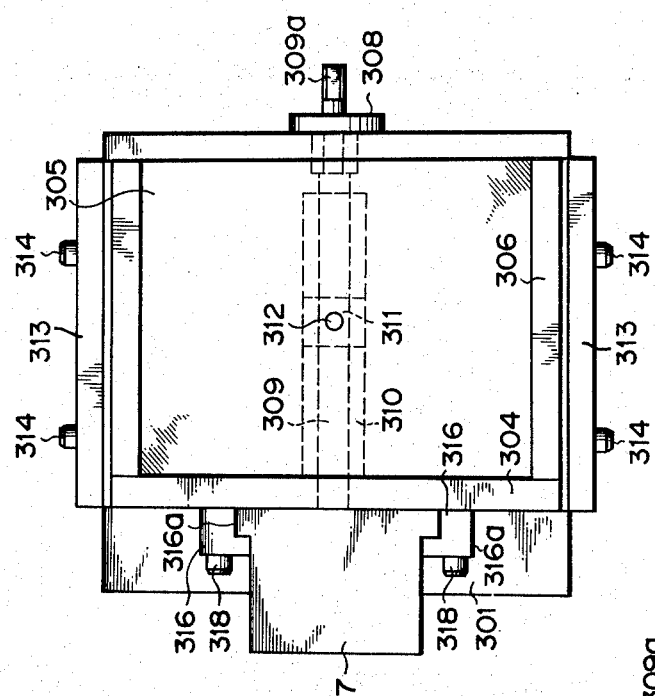
FIG. 23 is a plan view of the supporting structure of FIGS. 21 and 22.
Figure 22:
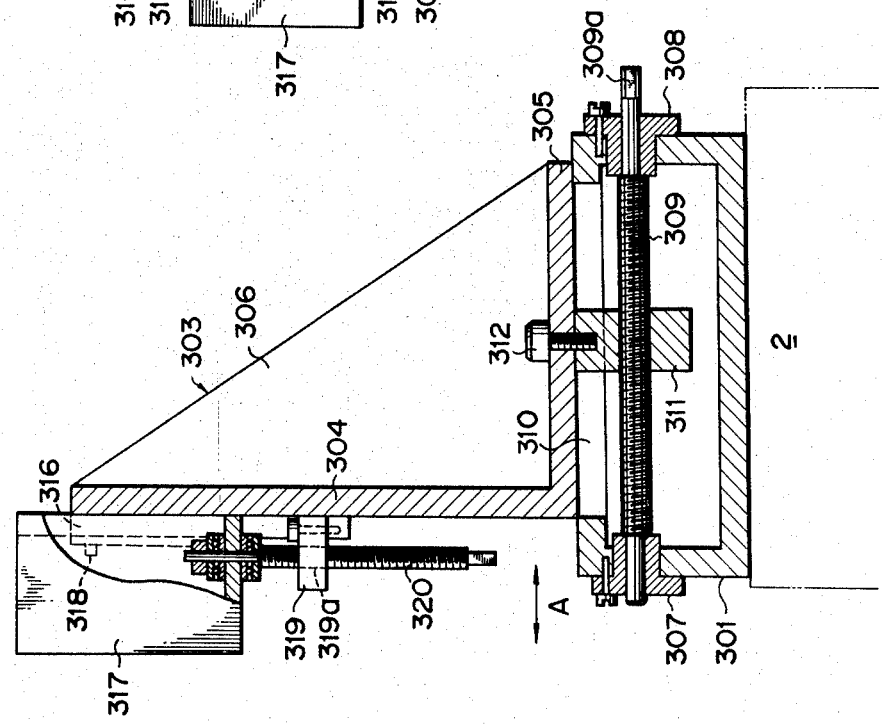
FIG. 22 is a side view of the supporting structure of FIG. 21.

FIGS. 21 to 23 jointly indicate a supporting structure according to an embodiment of this invention for use with the present take-out device. Numeral 301 denotes a box type base, which is fitted to the injection molding machine 2 with bolts 302 as in the embodiment of FIGS. 1 to 3. On the base 301 is mounted a support member 303 comprising a support frame consisting of a supporting plate 304 set upright at the front end of the base 301 and a sliding plate 305 whose underside contacts the upper surface of the base 301 and which is constructed integrally with the supporting plate 304, thus assuming an L-shape in cross section; and side plates 306 disposed on both sides of the supporting frame for its reinforcement. Said support member 303 can slide horizontally in the direction of the arrow A of FIG. 22.

To the center of the front and rear end portions of the base 301 are fitted bushings 307 and 308 respectively. Into the bushings 307 and 308 are rotatably fitted the shanks of a horizontal feed screw 309 to place it lengthwise in the base 301. The rear shank 309a of the feed screw 309 projects outside of the base 301, enabling the feed screw 309 to be rotated from the outside by turning said shank 309a. That portion of the upper surface of the base plate 301 which is disposed right above the feed screw 309 is perforated with a lengthwise elongate hole 310. With the feed screw 309 is engaged a feed block 311 whose upper surface is fixed to the underside of the sliding plate 305 with a screw 312, through a screw hole bored at the center of said block 311.

To both sides of the sliding plate 305 are fitted with screws 314 members 313 for guiding said plates lengthwise on the base 301. At the lower end of the guide member 313 is formed a bent portion 314a which extends inward so as to surround the underside of the upper projecting part of the base 301 which assumes, an I-shape in cross section. A fixing screw 315 inserted through said bent portion 314a secures the support member 303 to the base 301.

To the front upper part of the support plate 304 are fitted a pair of guiding member 316 extending vertically along the surface of said support plate 304. A head 317 is fixed to the supporting plate 304 with fixing screws 318 and can slide vertically through guide ways 316a (FIG. 23) formed in said guide members 316 when the fixing screws 318 are loosened.

Members to be fixed in the head 317 are the same as those of FIGS. 1 to 18 and omitted from FIGS. 22 and 23.

Substantially at the front central part of the supporting plate 304 and between the lower ends of the paired guide members 316 is disposed a bracket 319 so as to project outward from the front side of the support member 303. The bracket 319 is perforated with a vertical screw hole 319a, through which there is inserted a vertical feed screw 320, the upper end of said screw 320 being fitted to the underside of the head 317 (FIG. 23).

According to the aforementioned supporting structure, when the fixing screws 315 are loosened to rotate the rear shank 309a, then the horizontal feed screw 309 which forms an integral body with said shank 309a rotates in the same direction to permit the entire supporting structure to slide back and fourth along the surface of the base 301. When the fixing screws 315 are tightened after the supporting structure has been moved for a required distance, said structure will be again secured to the base 301.

Further, when the vertical feed screw 320 is rotated by loosening the fixing screws 318, the head 317 can be adjusted in its vertical position. When the fixing screws 318 are tightened after said adjustment, the head 317 is again fixed to the support member 303. Accordingly, the aforementioned supporting structure has the advantage of being fitted to a large variety of injection molding machines without carrying out any change in the design of the take-out device of the present invention.

What we claim is:

1. A vertical type automatic take-out device for injection molding machines including:
    a. a base mounted on the injection molding machine;
    b. a sliding member mounted on said base so as to slide in a first direction and in a second direction opposite thereto;
    c. a support extending upwardly from said sliding member;
    d. a head mounted on the upper portion of said support and slidable along said support for adjustment of the height of said head;
    e. a main shaft penetrating said head and projecting therefrom in said first direction;
    f. a swing member pivotally mounted on said main shaft;
    g. a swing shaft arranged in parallel with said main shaft and penetrating said swing member so as to project therefrom in said first direction;
    h. a combination of a first cylinder pivotally connected with said head and a first piston rod means inserted into said first cylinder and connected with said swing shaft so as to rock said swing member together with said swing shaft by the operation of said first cylinder and first piston rod;
    i. a holder penetrated by said main shaft and swing shaft and slidable along said main and swing shafts;
    j. a guiding rod arranged in parallel with said main shaft and projecting from said head in said first direction;
    k. a sliding block means receiving said holder and mounted on said guiding rod so as to slide lengthwise thereof;
    l. a combination of a second cylinder normally substantially vertically held by said holder and a second piston rod means inserted into said second cylinder so as to move through said second cylinder;
    m. a combination of a third cylinder mounted on said head in parallel with said guiding rod and a third piston rod means inserted into said third cylinder so as to move along said guiding rod, said third piston rod being fixed to said sliding block;
    n. a first chucking mechanism comprising a first mounting member coupling said second piston rod to said first chucking mechanism, a fourth cylinder extending downwardly from said mounting member, a fourth piston rod means inserted into said fourth cylinder to move therethrough, a casing connected with said fourth cylinder, a first link connected with said fourth piston rod, a pair of second links having their upper ends pivoted to the respective ends of said first link, and a pair of third links having their middle portions pivotally supported on said casing and their upper ends pivoted to the lower ends of the respective second links wherein said third links hold a runner in the injection molding machine when said fourth piston rod is advanced from said fourth cylinder and releases said molded products when said fourth piston rod is retracted into said fourth cylinder;
    o. an extension member connected to said first mounting member so as to project therefrom in said first direction;
    p. a second chucking mechanism disposed in parallel with said first chucking mechanism, said second chucking mechanism comprising a combination of fifth cylinder mounted on said extension member and a fifth piston rod means inserted thereinto and movable in parallel with said fourth piston rod of said first chucking mechanism; a fixed frame including a first top member connected with said fifth cylinder and a pair of first vertical side members extending downwardly from both ends of said first top member; a vertically movable frame including a second top member connected with said fifth piston rod so as to move said movable frame together with the fifth piston rod, a pair of second vertical side members extending downwardly from both ends of said second top member, said vertically movable frame being so disposed as to face said fixed frame; a first crosswise movable frame so disposed as to face the opposite side of the fixed frame to that which faces said movable frame, said first crosswise movable frame comprising a pair of third vertical side members, first traverses fixed thereto, fourth links disposed slantwise with respect to the second vertical side members of said vertically movable frame and said first traverses of said first crosswise movable frame, each of said fourth links having one end pivoted to one of said second vertical side members and the other end pivoted to the corresponding first traverse, and fifth links each having one end pivoted to substantially the center of the corresponding fourth link and the other end pivoted to one of said first vertical side members of the fixed frame thereby moving said first crosswise movable frame across said fixed frame upon operation of said fifth piston rod; and a second crosswise movable frame comprising a pair of fourth vertical side members and mostly superposed on said first crosswise movable frame, second traverses fixed thereto, sixth links disposed slantwise with respect to said second vertical members of said vertically movable frame and said second traverses of said second crosswise movable frame, each of said sixth links having one end pivoted to the other of said second vertical side members and the other end pivoted to the corresponding second traverse and seventh links each having one end pivoted to the center of the corresponding sixth link and the other end pivoted to the other of said first vertical side member of said fixed frame thereby moving the second crosswise movable frame across said fixed frame upon operation of said fifth piston rod, whereby the third vertical side members of the first crosswise movable frame and the fourth vertical side members of the second crosswise movable frame hold molded products therebetween when the fifth piston rod is retracted in the fifth cylinder;

q. a detecting means mounted on said base for detecting the number of molded products taken out by said chucking means.

2. Apparatus according to claim 1, wherein there are provided depressions in those sides of said third vertical side members which face said fourth vertical side members adjacent to the corresponding third vertical side members and there are provided depressions in those sides of said fourth vertical side members which face the depressions in said third vertical side members adjacent to the corresponding fourth side members, said depressions in said third and fourth side members being spaced at an interval equal to that at which molded products are held in the molds and co-operating with each other to hold said molded products when said fifth piston rod is retracted in said fifth cylinder.

3. Apparatus according to claim 2 further comprising a pair of guide members mounted on said extension member substantially in parallel with each other and extending in said first and second directions, a second sliding member inserted between said guide members so as to be slidable in said first and second directions, said second sliding member being connected to said second chucking mechanism, a sixth cylinder mounted on said extension member, a sixth piston rod means inserted into said sixth cylinder so as to be slidable in said first and second directions, said sixth piston rod being connected to said second sliding member to move said second chucking mechanism in said first and second directions upon operation of said sixth piston rod.

4. Apparatus according to claim 3 wherein said second sliding member carries said second chucking mechanism.

5. Apparatus according to claim 2 further comprising a guide member fixed to said first mounting member, a third sliding member connected to said first chucking mechanism and guided by said guide member so as to be slidable in said first and second directions, an additional cylinder connected to said first mounting member, an additional piston rod means inserted into said additional cylinder so as to be slidable in said first and second directions, said additional piston rod being fixed to said third sliding member to move said first chucking mechanism in said first and second directions upon operation of said additional piston rod.

6. Apparatus according to claim 5 wherein said sliding member carries said first chucking mechanism.

7. Apparatus according to claim 1 wherein said sliding block means is a generally U-shaped member.

* * * * *